United States Patent [19]

Martin et al.

[11] Patent Number: 5,712,704
[45] Date of Patent: Jan. 27, 1998

[54] APPLIANCE FOR MEASURING POLARIZATION MODE DISPERSION AND CORRESPONDING MEASURING PROCESS

[75] Inventors: Philippe Martin, Pontchartrain; Gilles Le Boudec, Mareil Marley; Edouard Taufflieb; Herve Lefevre, both of Paris, all of France

[73] Assignee: Photonetics, Marly Le Roi, France

[21] Appl. No.: 713,399

[22] Filed: Sep. 13, 1996

[30] Foreign Application Priority Data

Sep. 13, 1995 [FR] France ................................. 95 10727

[51] Int. Cl.[6] .................................................. G01B 9/02
[52] U.S. Cl. ......................... 356/351; 356/345; 356/73.1
[58] Field of Search ............................... 356/345, 346, 356/351, 73.1

[56] References Cited

U.S. PATENT DOCUMENTS

| | | | |
|---|---|---|---|
| 4,893,931 | 1/1990 | Lefevre et al. | 356/73.1 |
| 5,206,924 | 4/1993 | Kersey | 356/351 |
| 5,255,068 | 10/1993 | Emo et al. | 356/351 |

OTHER PUBLICATIONS

*Journal of Lightwave Technology*, vol. 9, No. 7, 1 Jul. 1991, pp. 821–827, Gisin et al, "*Polarization Mode Dispersion of Short and Long Single–Mode Fibers*".

*Electronics Letters*, vol. 17, No. 4, 19 Feb. 1981, pp. 153–154, K. Mochizuki et al, "*Polarisation Mode Dispersion Measurments in Long Single Mode Fibres*".

*Optics Letters*, vol. 19, No. 15, 1 Aug. 1994, pp. 1104–1106, B. L. Heffner, "*Single–Mode Propagation of Mutual Temporal Coherence: Equivalance of Time and Frequency Measurements of Polarization–Mode Dispersion*".

*Patent Abstracts of Japan*, vol. 010, No. 019 (P-423), 24 Jan. 1986 & JP-A-60 173429 (Nippon Denshin Denwa Kosha), 6 Sep. 1985.

Primary Examiner—Frank G. Font
Assistant Examiner—Robert Kim
Attorney, Agent, or Firm—Nikaido, Marmelstein, Murray & Oram LLP

[57] ABSTRACT

An appliance for measuring polarization mode dispersion (PMD) of a waveguide (2) comprises a source (1, 6) of wide-band polarized light, an interferometer (5) capable of receiving a light beam (21) sent by the source (1, 6), a detector (3) capable of detecting the light beam (25) from the interferometer (5), and an electronic processing unit (4) connected to the detector (3), capable of extracting a value $\tau$ representative of the polarization mode dispersion of the waveguide (2). The interferometer (5) divides a measuring light beam (22) sent by the source (1) into two interference light beams (23, 24). The measuring appliance comprises at least one birefringent element (17) positioned on the interferometer (5), capable of producing an algebraic difference of relative phase shifts in each of the two interference light beams (23, 24) equal to $\pi$.

10 Claims, 2 Drawing Sheets

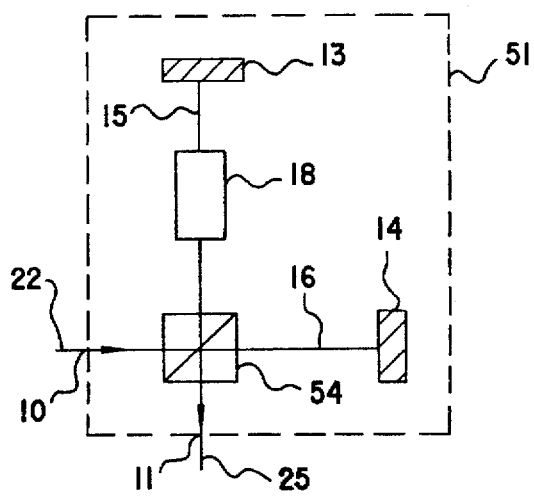
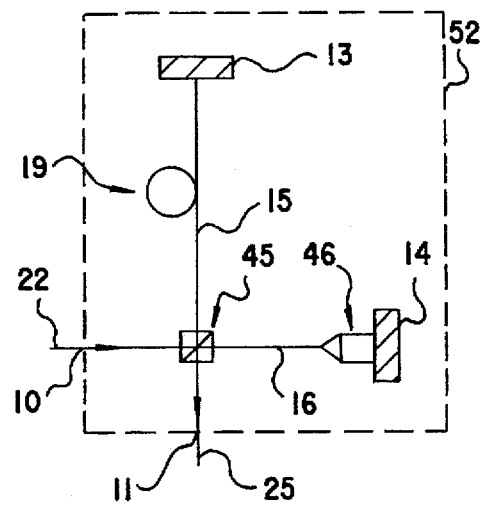
FIG.4    FIG.5
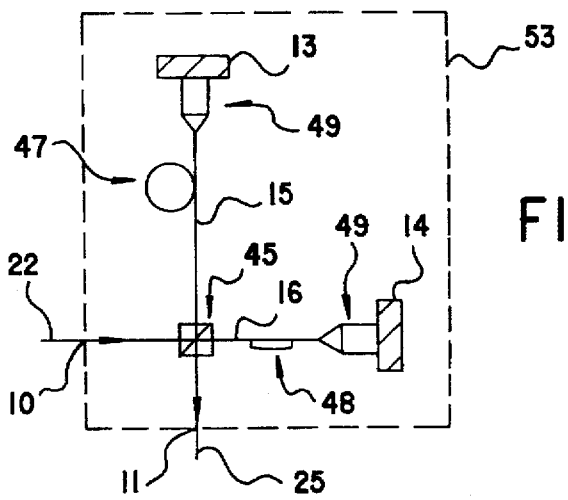
FIG.6
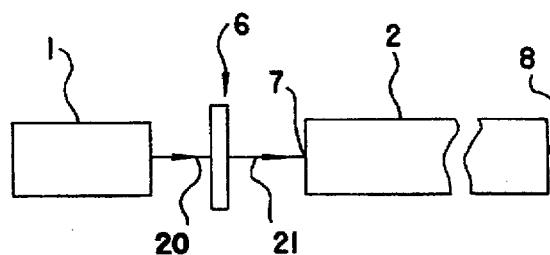
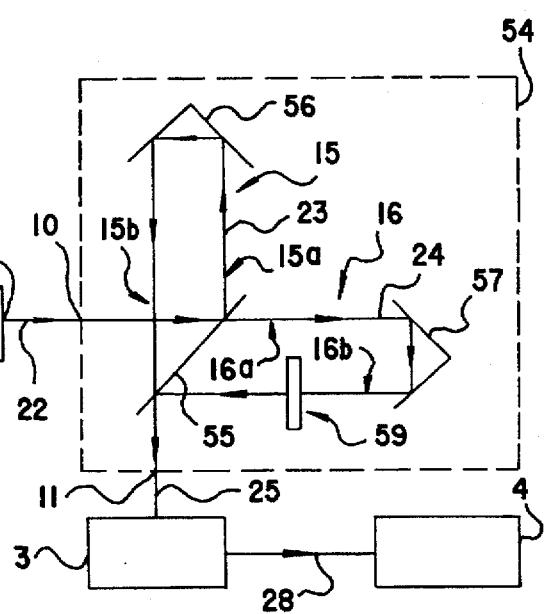
FIG.7

APPLIANCE FOR MEASURING POLARIZATION MODE DISPERSION AND CORRESPONDING MEASURING PROCESS

This invention relates to an appliance for measuring the polarization mode dispersion of a waveguide and a corresponding measuring process. It may be applied to the study and analysis of optical fibers, particularly in the telecommunications field, for transmission systems.

Polarization mode dispersion, or PMD, is known to be a limiting factor for a fiber system designed for use in a very wide-band transmission. It is a characteristic peculiar to the fiber, indicating the type of signals that this fiber is capable of sustaining without imposing excessive distortion on said signals.

Polarization mode dispersion is a mathematical quantity, defined for example in W. EICKHOFF, Y. YEN and R. ULRICH, Applied Optics, vol. 20, 3428, 1981. A light beam being sent into the waveguide with an input polarization state and an input frequency, the polarization mode dispersion is representative of the variation of the polarization state of the beam from the waveguide in function of the input frequency.

Two principal categories of waveguides, corresponding to different states, may be distinguished. In a low-coupling state, polarization mode dispersion is independent of the input frequency. This state is obtained with fibers of high birefringence or of short length such as telecommunications fibers less than 100 m in length. In such cases, the polarization mode dispersion is the difference in group propagation times between the two principal states of polarization independent of the wavelength, and is proportional to the length of the waveguide.

In contrast, in the high-coupling state, polarization mode dispersion depends randomly on the input frequency. This state is obtained for long and low-birefringence fibers, the orientation of the local birefringence axes being randomly distributed. The fibers are typically telecommunications fibers with lengths of over 1 km. In this case, polarization mode dispersion increases as the square root of the length, as for example expounded in C. D. POOLE, "Statistical treatment of polarization dispersion in single-mode fiber", Optics Letters, vol. 13, pp. 687–689, 1986.

In this high-coupling state, interest centers on the mean polarization mode dispersion $\tau$ given by the root mean square or RMS of the polarization mode dispersion according to frequency, corresponding to a standard deviation.

In the ensuing description, the polarization mode dispersion $\tau$ will be taken to refer to both real polarization mode dispersion in the low-coupling state and mean polarization mode dispersion in the high-coupling state.

White light interferometry constitutes a powerful tool for measuring the polarization mode dispersion of a waveguide. In reality, white light is taken to mean a wide-spectrum light, as opposed to a technique using a single wavelength. The bandwidth of a source emitting a wide-spectrum light generally extends over a few per cents around a mean wavelength. For example, an erbium-doped fiber source has a bandwidth of 10 to 30 nm around 1550 nm, a Light Emitting Diode (LED) has a bandwidth of about 100 nm around 800, 1300 or 1500 nm, and a Super Luminescent Diode (SLD) has a bandwidth of about 20 nm around 840 nm.

The appliances commonly used for measuring the polarization mode dispersion of a waveguide comprise a wide-band light source sending a light beam into the waveguide through a linear polarizer. The waveguide is followed by an analysis polarizer and an interferometer, the light beam from the waveguide being analyzed and then submitted to interference. The interferometer having two arms diverging from its input and coming together at its output, the measuring light beam sent by the source is divided in the interferometer into two interference light beams which combine at its output, with a temporal deviation equal to $\Delta t$. The output of the interferometer is connected to a detector detecting the interference signal obtained, and the detector itself is connected to an electronic processing unit into which it sends an electronic signal representative of the detected optical signal. The electronic processing unit habitually extracts the polarization mode dispersion $\tau$ from the curve giving the detected luminous intensity I in function of the temporal deviation $\Delta t$.

An installation of this kind is proposed, for example, in the article by Hervé LEFEVRE, "Comments about the fiber-optic gyroscope", SPIE Proceedings, vol. 838, pp. 86–97, 1987, the Michelson interferometer being used.

In the case of high coupling, the envelope curve of I ($\Delta t$) admits a high central peak surrounded by close fluctuations. The fluctuations present an envelope with a roughly bell-shaped aspect whose top has an abscissa corresponding to that of the central peak. In point of fact, the central peak is due exclusively to an effect of the source whereas the fluctuations are representative of the polarization mode dispersion. The peak, therefore, does not provide significant information and hinders the processing of the detected signal, thereby constituting an obstacle to the accurate measurement of the polarization mode dispersion $\tau$.

The curve I ($\Delta t$) also receives attention in an assembly proposed by B. L. HEFFNER in "Single-mode propagation of mutual temporal coherence: equivalence of time and frequency measurements of polarization-mode dispersion", Optics Letters, vol. 19, No. 15, pp. 1104–1106, 1994. This assembly comprises a LED sending a light beam towards an interferometer through a polarizer at 45°. The interferometer includes two arms on which are placed, respectively, a polarizer at 0° and a polarizer at 90°. The interferometer output leads to the waveguide, and the light beam is led to a detector through a polarizer at 0°. This assembly results in the disappearance of the central peak in the curve I ($\Delta t$) but it is of complex construction. In particular, it requires the presence of an analysis polarizer at 0°.

The purpose of this invention is to obtain an appliance for measuring the polarization mode dispersion of a waveguide which is both simple and accurate.

More specifically, the invention concerns such an appliance which prevents parasitic central peaks from appearing in the envelope curve of I ($\Delta t$) obtained from a detected light beam.

Moreover, the invention concerns such an appliance which is simple to construct and use.

The invention also concerns a process of measuring polarization mode dispersion giving accurate results in a simple way.

The aim of the invention is to provide an appliance and a process such as described above which are valid for both high and low-coupling states.

For this purpose, the invention provides an appliance for measuring the polarization mode dispersion (PMD) of a waveguide. This appliance comprises:

a wide-band polarized source of light capable of sending a measuring light beam into a first extremity of the waveguide, an interferometer including an input capable to receive the measuring light beam from the second extremity of the waveguide, an output capable of transmitting this light beam, and two arms diverging from the input and converging at the output; this interferometer divides the measuring light beam into two interference light beams crossing respectively the two arms and combining at the output of the interferometer by producing interference, a detector capable of detecting the measuring light beam from the waveguide, an electronic processing unit linked to the detector, capable of extracting a value representative of the polarization mode dispersion of the waveguide from the detected measuring light beam.

According to the invention, the measuring appliance comprises at least one birefringent element, having two independent modes of polarization, placed on at least one of the arms of the interferometer, the independent modes of the birefringent elements being identical, the algebraic sum of the elementary phase shifts produced by the birefringent elements respectively in each of the arms being equal to a relative phase shift and the algebraic difference of the two relative phase shifts having a value of $\pi$.

The presence of the birefringent element placed on the interferometer and producing a phase shift difference of $\pi$, sets the measuring appliance according to the invention apart from existing appliances.

Said birefringent element makes it possible to obtain, in the electronic processing unit, an envelope curve of I ($\Delta t$) without parasitic central peak for calculating the polarization mode dispersion $\tau$.

The interferometer used in a first realization form of the measuring appliance according to the invention is a Michelson interferometer.

In this case, the measuring appliance advantageously comprises a single birefringent element placed on one of the two arms of the interferometer.

According to three preferred embodiments of this element:

the element is a quarter-wave birefringent plate, the element is a 45° Faraday rotator, the element is a fiber loop generating a quarter-wave birefringence by curvature.

In this first realization form of the interferometer, another preferred embodiment of the birefringent elements is such that they consist of two fiber loops each generating an eighth-wave birefringence by curvature. A first loop is made on one of the arms of the interferometer in a first plane, and the second loop on the other arm of the interferometer in a second plane perpendicular to the first plane.

The interferometer used in a second form of fabrication of the measuring appliance according to the invention is a Mach-Zehnder interferometer.

In this case, the element is advantageously a half-wave birefringent plate placed on one of the two arms of the interferometer.

The invention also concerns a process for measuring the polarization mode dispersion of a waveguide. In this process:

a measuring light beam, emitted by a wide-band polarized source of light, is sent into the waveguide, interferences are produced, by an interferometer, in this beam, by separating the measuring light beam into two interference light beams and by then combining them in order to reconstitute the measuring light beam, the interference light beams having a temporal deviation $\Delta t$ when combined, the measuring light beam from the waveguide having a luminous intensity I is then detected by means of a detector, the temporal deviation $\Delta t$ is caused to vary in time and a value representative of the polarization mode dispersion of the waveguide is extracted from the detected intensity I ($\Delta t$).

According to the invention, a relative phase shift is produced in each of the interference light beams, the algebraic difference of the two relative phase shifts having a value of $\pi$.

In a preferred application of the measuring process according to the invention, the waveguide having a high-coupling state, the root mean square $\tau$ of the polarization mode dispersion, or mean polarization mode dispersion, is extracted in the following manner:

a calculation is made of the root mean square width $\sigma$ of the detected intensity I ($\Delta t$), given by:

$$\sigma^2 = \frac{\int \Delta t^2 I(\Delta t)^2 d(\Delta t)}{\int I(\Delta t)^2 d(\Delta t)}$$

the mean polarization mode dispersion $\tau$ is deduced by:

$$\tau = \sqrt{\frac{3}{2}} \, \sigma$$

This invention will now be illustrated, without in any way being limited, by examples of embodiment and application referring to the accompanying drawings in which:

FIG. 1 represents a first embodiment of an appliance for measuring polarization mode dispersion according to the invention;

FIG. 2 shows the envelope of the curve I ($\Delta t$) of the detected luminous intensity I by the detector of the appliance in FIG. 1, in function of the temporal deviation $\Delta t$ between the interference beams converging at the output of the interferometer, the temporal deviation $\Delta t$ being expressed in picoseconds and the detected luminous intensity I in an arbitrary unit, for a waveguide presenting a high coupling;

FIG. 3 shows the envelope of the curve I ($\Delta t$) of the luminous intensity I detected by the detector of the appliance in FIG. 1, in function of the temporal deviation $\Delta t$ between the interference beams converging at the output of the interferometer, the temporal deviation $\Delta t$ being expressed in picoseconds and the detected luminous intensity I in an arbitrary unit, for a waveguide presenting a low coupling;

FIG. 4 represents a first alternative of the interferometer of the appliance in FIG. 1;

FIG. 5 represents a second alternative of the interferometer of the appliance in FIG. 1;

FIG. 6 represents a third alternative of the interferometer of the appliance in FIG. 1;

FIG. 7 shows a second embodiment of an appliance for measuring polarization mode dispersion according to the invention.

Figure 1:
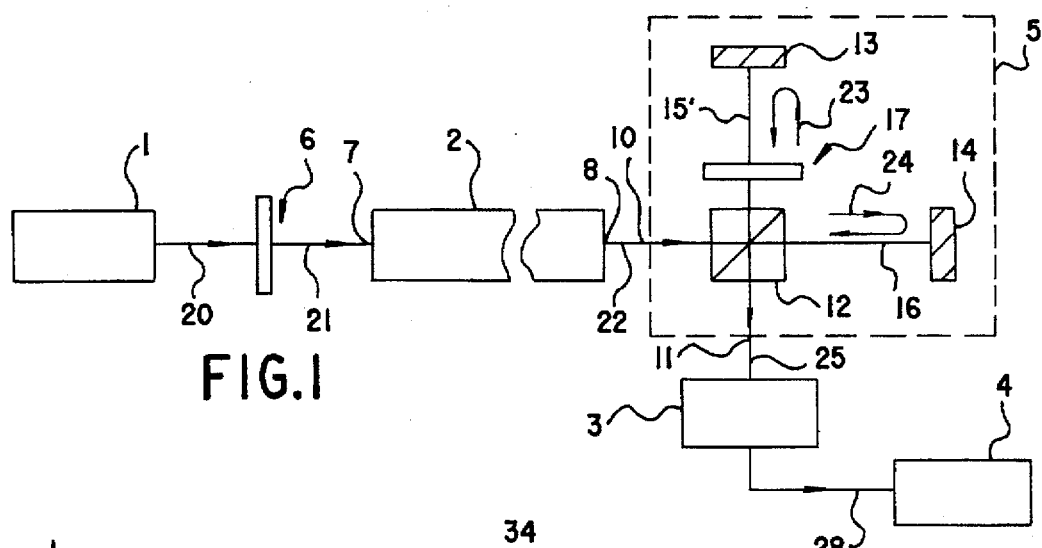

In FIGS. 4 to 7, elements analogous to those represented in FIG. 1 are designated by the same references.

A measuring appliance according to the invention, such as that represented in FIG. 1, is designed to measure the polarization mode dispersion of a waveguide 2. This waveguide is typically an optical fiber, more specifically of the type used for transmissions in telecommunications. The waveguide 2 comprises a first extremity 7 and a second extremity 8, a luminous signal traveling from one extremity to the other of the waveguide 2. For example, the waveguide 2 is placed in such a way that the light crosses it from the first extremity 7 towards the second extremity 8.

The measuring appliance represented comprises a source 1 of wide-band light, capable of sending an incident light beam 20 towards the first extremity 7 of the waveguide 2. This source 1 is, for example, one of those previously indicated (erbium source, LED or SLD), and emits an essentially polarized light.

A polarizer 6 is placed between source 1 and waveguide 2, and polarizes the incident light beam 20 in a polarized light beam 21. Polarizer 6 is for example linear, but may also be of another type, such as circular or more generally elliptical.

The unit constituted by the depolarized source 1 and the polarizer 6 may, if required, be replaced by a polarized source.

A Michelson interferometer 5 is placed at the output of the waveguide 2 and is capable of receiving an output light beam 22 coming from the second extremity 8 of the waveguide 2.

The interferometer 5 includes an input 10 capable of receiving the output light beam 22, and an output 11 capable of transmitting a recomposed light beam 25 obtained by the passage of the output light beam 22 in the interferometer 5.

The measuring appliance also includes a detector 3 capable of detecting the recomposed light beam 25 and of emitting an electrical signal 28 corresponding to the detected optical signal in the direction of an electronic processing unit 4.

The electronic processing unit 4, connected to the detector 3, is capable of extracting a value representative of the polarization mode dispersion of the waveguide 2, from the electrical signal 28.

The interferometer 5 will now be described in greater detail. It comprises a separator 12, capable of dividing the output light beam 22 into two interference light beams 23 and 24 and of combining these interference light beams 23 and 24 in the recomposed light beam 25. The separator 12 typically includes a semi-reflecting 45° plate or a 50—50 fiber coupler.

Interferometer 5 also comprises two arms 15 and 16 culminating respectively in a fixed reflector 13 and a scanning reflector 14. The scanning reflector 14 is mobile, parallel to the second arm 16, and makes it possible to carry out a scanning, in standard fashion, causing variations of the length of the second arm 16. This scanning is, for example, performed over a few centimeters at a speed of a few mm/sec. Arms 15 and 16 are designed to be traveled, respectively, by the interference light beams 23 and 24, from the separator 12 as far as the reflectors 13 and 14 and, then by reflection in the opposite direction as far as the separator 12, the two interference beams 23 and 24 combining in the separator 12 by producing interferences.

The measuring appliance comprises a quarter-wave birefringent plate marked 17, placed on the first arm 15 of the interferometer 5 between separator 12 and fixed reflector 13. This plate 17 is of the first order and may be a thick single plate. It admits two independent perpendicular modes of linear polarization and imposes on the two polarization components of the interference light beam 23 parallel to these independent modes, successively a phase shift of $\pi/2$ on the outward journey, and again on the return journey, during the course of the first arm 15. It thus produces a relative phase shift equal to $\pi$.

A phase shift compensation system, such as a Babinet compensator, is advantageously placed on arm 15 between separator 12 and plate 17 for purposes of adjustment. The system aims to cancel the parasitic effects of polarization dispersion, due to birefringence sources other than the plate 17.

Before measurements are performed, a preliminary step consists in adjusting the measuring appliance in the absence of the waveguide 2. For this purpose a naturally depolarized source 1 is used, such as an erbium doped fiber source, without positioning the polarizer 6. The Michelson interferometer is then operated by putting the scanning reflector 14 into movement.

Thanks to the optical signal detected by detector 3, it is now possible to obtain, in the electronic processing unit 4, the detected luminous intensity I in function of the temporal deviation $\Delta t$ between the two interference beams 23 and 24 combining in the separator 12. The temporal deviation $\Delta t$ may be expressed in function of the propagation speed c in arms 15 and 16, and the path difference $\Delta L$ between the two interference beams 23 and 24 combined in the separator 12:

$$\Delta t = \frac{2\Delta L}{c}$$

In the presence of parasite mode dispersion, curve I ($\Delta t$) presents a high central peak. This peak may be eliminated by using an adjustment sitting, such as the above-mentioned Babinet compensator, to balance the interferometer 5.

It is interesting to note that the orientation of the plate 17 has no effect on the rate of curve I ($\Delta t$). This is explained by the fact that, the light being depolarized, the mean power is independent of the direction considered.

Once this balancing operation has been accomplished, the polarizer 6 and the waveguide 2 to be measured are put into position.

In a first application example of particular practical interest, the waveguide 2 admits a high coupling. This waveguide 2 is, for example, a long fiber of weak birefringence. Source 1 is a LED emitting the incident light beam 20 around a wavelength of 1500 nm.

Figure 2:
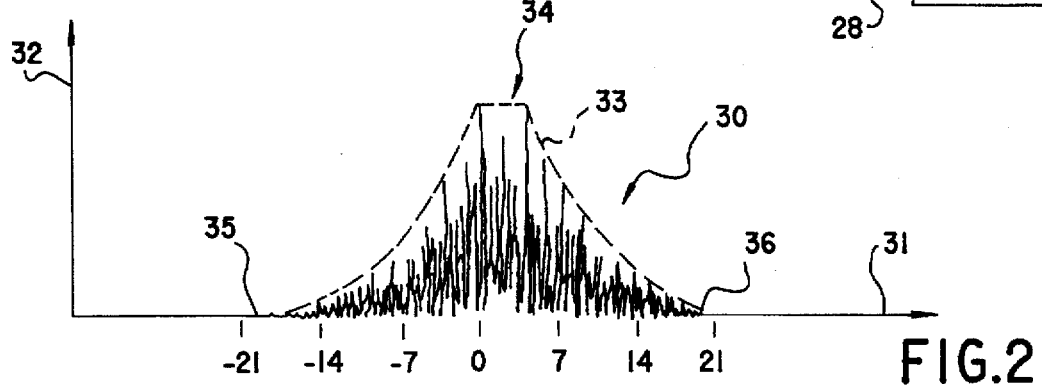

After operating the interferometer 5 by translation of reflector 14 and detecting the recomposed light beam 25, curve I ($\Delta t$) is obtained by the electronic processing unit 4. The variation envelope I ($\Delta t$) is represented by a curve 30, brought to a first axis 31 of temporal deviation and to a second axis 32 of luminous intensity, and traced in FIG. 2. This curve represents fluctuations centered around a zero temporal deviation $\Delta t$, these fluctuations having an envelope 33 roughly in the shape of a bell. The envelope 33 attains a maximum plateau 34 in the region of 0, and decreases in approximately symmetrical fashion on either side of 0. It reaches zero intensity in a left point 35 and a right point 36, situated at a value of the temporal deviation $\Delta t$ slightly less than 21 ps in absolute values.

The electronic processing unit 4 next calculates the root mean square width $\sigma$ of the detected intensity I ($\Delta t$), given by:

$$\sigma^2 = \frac{\int \Delta t^2 I(\Delta t)^2 d(\Delta t)}{\int I(\Delta t)^2 d(\Delta t)}$$

The mean polarization mode dispersion $\tau$ is deduced by the relation:

$$\tau = \sqrt{\frac{3}{2}} \, \sigma$$

as may be shown theoretically.

It emerges from this first application example that the polarization mode dispersion $\tau$ has a value of 6.8 ps.

It should be noted that, as with the adjustment, the orientation of the plate 17 is of no importance, since the light leaving the waveguide 2 is depolarized, due to the polarization mode dispersion produced by the high coupling.

It is important to note there is no appearance of central peak liable to distort the measurements. Only information representative of the polarization mode dispersion $\tau$ is present. The previously described embodiment of the appliance according to the invention systematically results in the absence of parasitic central peaks. In point of fact, interferometer 5 produces an optical signal equivalent to the sum of elementary signals which would be supplied by two elementary interferometers, each functioning for one of the two independent states of the plate 17. Owing to the relative phase shift of π, these elementary signals have central peaks admitting a phase opposition. Their sum is thus constant, canceling the total effect of the central peak.

Figure 3:
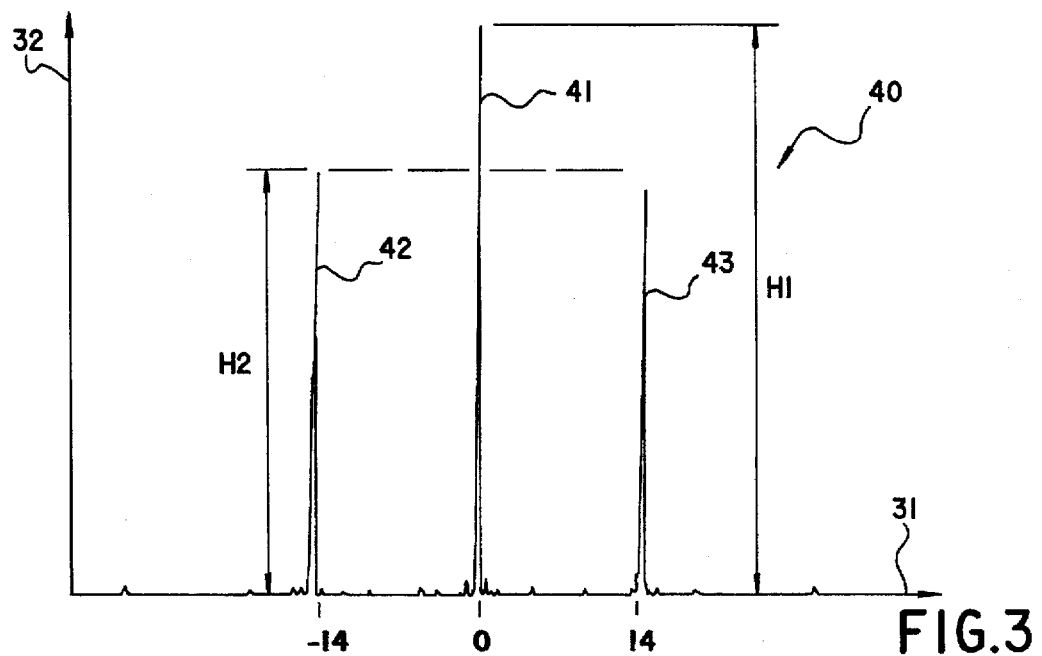

In a second application example, the waveguide 2 admits a low coupling. It is typically constituted by a fiber of high birefringence or of short length. As in the first example, source 1 is a LED and the incident light beam 20 has a specter centered around 1500 nm. A curve 40 is then obtained giving the detected luminous intensity I in function of the temporal deviation Δt, such as represented in FIG. 3. Curve 40 is constituted of three peaks and does not present a significant supplementary signal. The three peaks consist of a central peak 41 of height H1 situated in 0, and of two peaks 42 and 43 symmetrically placed, respectively on the left and on the right of the central peak 41, and having heights which are roughly similar and equal to H2.

Peaks 42 and 43 are respectively situated at abscissas approximately equal to −14.2 ps and 14.2 ps.

The electronic processing unit 4 extracts the polarization mode dispersion τ directly from the abscissas of the peaks 42 and 43 to which said abscissas it is equal. It therefore has a value of 14.2 ps. In fact, the waveguide 2 having orthogonal birefringence axes, the angle between the polarization of the polarized light beam 21 and these birefringence axes is marked α, and the angle between the plate axis 17 and the birefringence axes is marked β. Then:

$$H1 = \cos(2\alpha)\cos(2\beta)$$

$$H2 = \frac{1}{2} \sin(2\alpha)\sin(2\beta)$$

Thanks to plate 17, central peak 41 may be removed by adjusting the measuring appliance, although there is no particular reason for wishing to do so in this case.

The appliance according to the invention is thus particularly advantageous for high-coupling waveguides and may also be used for low-coupling waveguides. Moreover, no analysis polarizer is required.

In a first alternative of the interferometer and the birefringent element used in the first embodiment, represented in FIG. 4, interferometer 51 comprises a separator 54 producing interference light beams 23 and 24 and the birefringent element consists of a 45° Faraday rotator 18 placed on the first arm 15 of the interferometer 51. The independent modes of the birefringent element are now circular, and no longer linear as in the first embodiment (FIG. 1). The Faraday rotator 18 produces a phase shift of π/2 between the circular polarization states of the interference light beam 23 corresponding to these independent modes on the outward and return journey.

In a second alternative of the interferometer and the birefringent element used in the first embodiment, represented in FIG. 5, interferometer 52 is fitted with a fiber loop 19 generating by curvature a quarter-wave birefringence, corresponding to a phase shift of π/2, performed on the first arm 15. Since the orientation of the fiber loop 19 has no effect on the phase shift, this property is obtained by adjusting the curve of the loop, and in particular by adjusting its diameter.

As an example, such a loop is made from a fiber having a cladding of 125 μm in diameter, by performing two turns of fiber defining a circumference with a diameter of 30 mm.

In addition, the separator of the interferometer 52 consists of a coupler 45, and the second arm 16 culminates at the mobile reflector 14 by means of a free space 46.

The birefringent element 17, 18 or 19 may, without going beyond the scope of the invention, alternatively be placed on the second arm 16 of the interferometer 5, 51, 52.

It is also possible to obtain the phase shift difference of π between the polarization states of the interference light beams 23 and 24 by using several birefringent elements, either identical or dissimilar, on one or both of arms 15, 16.

The whole of the birefringent elements must then have identical independent modes. Thus, they are aligned on each of the arms 15, 16. Each of the birefringent elements produces, in the interference light beam 23, 24 traveling across it, an elementary phase shift between the independent modes, the algebraic sum of the elementary phase shifts in each of the arms 15, 16 being equal to a relative phase shift and the algebraic difference of the two relative phase shifts having a value of π.

A measuring appliance comprising two birefringent elements is represented, as an example, in FIG. 6. In this third alternative of the interferometer and the birefringent element, each of the two arms 15, 16 of interferometer 53 is respectively fitted with a fiber loop 47, 48 generating by curvature an eighth-wave birefringence. The two fiber loops 47, 48 are placed in curvature planes perpendicular to each other, in such a way as to produce the desired phase shift difference, equal to π. In FIG. 6, the first fiber loop 47 is parallel to the plane of the diagram and the second loop 48 is perpendicular to it. With a high-coupling state, the orientation of the fiber loops 47, 48 is of no consequence so long as their curvature planes remain perpendicular.

Free spaces 49 are provided between the fiber loops 47, 48 and, respectively, the reflectors 13, 14, and the separator is constituted by the coupler 45, as in the second alternative (FIG. 5).

In a second embodiment of the appliance according to the invention, a Mach-Zehnder interferometer 54 is used. This interferometer 54 comprises a separator 55 capable of dividing the output light beam 22 of the waveguide 2 into the two interference beams 23 and 24, and of combining them to form the recomposed light beam 25 by directing it towards the output 11. Moreover, contrary to the Michelson interferometer 5, 51, 52, the interference beams 23 and 24 are produced and combined, in standard fashion, in distinct zones of the separator 55.

The interferometer 54 also includes a first fixed reflecting trihedron 56 and a second mobile reflecting trihedron 57 on which the interference beams 23 and 24 are respectively reflected. Arms 15 and 16 establish optical paths between the separator 55 and, respectively, the reflecting trihedrons 56 and 57. Each of the two arms 15, 16 includes an outward branch 15a, 16a by which the corresponding interference light beam 23, 24 moves from the separator 55 towards the reflecting trihedron 56, 57, and a return branch 15b, 16b by which the interference beam 23, 24 follows the reverse path.

A half-wave birefringent plate of the first order, marked 59, is placed on the return branch 16b of the second arm 16 of interferometer 54. Its effect is to produce a relative phase shift of π between the polarization states of the interference light beam 24 parallel to the independent modes of plate 59. The effect is thus entirely similar to that obtained with the first embodiment (FIG. 1).

All the variations described above with reference to the Michelson interferometer are also valid for the Mach-Zehnder interferometer. Thus the separator 55 may be replaced by a separator capable of generating circular and crossed polarization states, and plate 59 by a 90° Faraday rotator. Plate 59 may also be replaced by a half-wave fiber loop.

Moreover, a different appliance of one or more birefringent elements in this second embodiment is also within the scope of the invention, provided that a phase shift difference of π is produced between the polarization states of the interference light beams 23 and 24 corresponding to the independent modes of the birefringent elements. Thus, plate 59 may alternatively be placed on one of the branches 16a, 15a or 15b. Its place may also be taken by two quarter-wave birefringent plates placed, respectively, on the branches 16a and 16b or two quarter-wave fiber loops performed, respectively, on the branches 15a or 15b, and 16a or 16b, in perpendicular curvature planes. The same result may be obtained by numerous other combinations of birefringent elements.

The Michelson and Mach-Zehnder interferometers have been presented for illustrative purposes only and it is clear that other interferometers may be used with the same advantages without going outside the scope of the invention.

The appliance and process according to the invention therefore provide simple and efficient ways of obtaining accurate measurements of polarization mode dispersion of waveguides.

We claim:

1. Appliance for measuring the polarization mode dispersion (PMD) of a waveguide (2) comprising:

a source (1, 6) of wide-band polarized light capable of sending a measuring light beam (21) into a first extremity (7) of waveguide (2), an interferometer (5, 51, 52, 53, 54) including an input (10) able to receive the measuring light beam (22) from the second extremity (8) of the waveguide (2), an output (11) capable of transmitting said light beam (25), and two arms (15, 16) diverging from the input (10) and converging at the output (11), said interferometer (5, 51, 52, 53, 54) dividing the measuring light beam (22) into two interference light beams (23, 24) crossing respectively the two arms (15, 16) and combining at the output (11) of interferometer (5, 51, 52, 53, 54) by producing interferences, a detector (3) capable of detecting the measuring light beam (25) from the interferometer (5, 51, 52, 53, 54), an electronic processing unit (4) linked to detector (3), capable of extracting a value (τ) representative of the polarization mode dispersion of the waveguide (2) from the detected measuring light beam (25), characterized in that it comprises at least one birefringent element (17, 18, 19, 46, 47, 59), having two independent modes of polarization, placed on at least one of the arms (15, 16) of the interferometer (5, 51, 52, 53, 54), the independent modes of the birefringent elements (17, 18, 19, 46, 47, 59) being identical, the algebraic sum of the elementary phase shifts produced by the birefringent elements respectively in each of the arms (15, 16) being equal to a relative phase shift and the algebraic difference of the two relative phase shifts having a value of π.

2. Measuring appliance according to claim 1, characterized in that the interferometer (5, 51, 52) is a Michelson interferometer.

3. Measuring appliance according to claim 2, characterized in that said birefringent element (17) is a quarter-wave birefringent plate placed on one of the two arms (15) of interferometer (5).

4. Measuring appliance according to claim 2, characterized in that said birefringent element (18) is a 45° Faraday rotator placed on one of the arms (15) of interferometer (51).

5. Measuring appliance according to claim 2, characterized in that said birefringent element (19) is a fiber loop generating by curvature a quarter-wave birefringence performed on one of the two arms (15) of interferometer (52).

6. Measuring appliance according to claim 2, characterized in that said birefringent elements (46, 47) consist of two fiber loops each generating by curvature an eighth-wave birefringence, the first of said loops (46) being performed on one of the arms (15) of interferometer (53) in a first plane, and the second of said loops (47), on the other arm (16) of interferometer (53) in a second plane perpendicular to the first plane.

7. Measuring appliance according to claim 1, characterized in that interferometer (54) is a Mach-Zehnder interferometer.

8. Measuring appliance according to claim 7, characterized in that said birefringent element (59) is a half-wave birefringent plate placed on one of the two arms (15) of interferometer (54).

9. Process for measuring the polarization mode dispersion of a waveguide (2) characterized in that:

a measuring light beam (21), emitted by a source (1, 6) of wide-band polarized light, is sent into the waveguide (2), interferences are produced, by an interferometer (5, 51, 52, 53, 54), in said beam (25), by separating the measuring light beam (21) into two interference light beams (23, 24) and by then combining them in order to reconstitute the measuring light beam (25), the interference light beams (23, 24) having a temporal deviation Δt when combined, the measuring light beam (25) from the waveguide (2) having a luminous intensity I is detected by means of a detector (3), the temporal deviation Δt is made to vary in time and a value τ representative of the polarization mode dispersion of the waveguide (2) is extracted from the detected intensity I (Δt) by means of an electronic processing unit (4), characterized in that a relative phase shift is produced in each of the interference light beams (23, 24), the algebraic difference of the two relative phase shifts having a value of π.

10. Measuring process according to claim 9, characterized in that the waveguide (2) having a high coupling rate, the root mean square τ of the polarization mode dispersion of the waveguide (2), or mean polarization mode dispersion, is extracted in the following manner:

a calculation is made of the root mean square width σ of the detected intensity I (Δt), given by:

$$\sigma^2 = \frac{\int \Delta t^2 I(\Delta t)^2 d(\Delta t)}{\int I(\Delta t)^2 d(\Delta t)}$$

the mean polarization mode dispersion τ is deduced by:

$$\tau = \sqrt{\frac{3}{2}} \, \sigma \ .$$

* * * * *